United States Patent
Honary et al.

(10) Patent No.: US 8,995,411 B2
(45) Date of Patent: *Mar. 31, 2015

(54) METHOD AND SYSTEM FOR CONTENT-AWARE MAPPING/ERROR PROTECTION USING DIFFERENT SPATIAL STREAMS

(75) Inventors: Hooman Honary, Newport Beach, CA (US); Jeyhan Karaoguz, Irvine, CA (US); Nambirajan Seshadri, Irvine, CA (US); Jason Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 2610 days.

This patent is subject to a terminal disclaimer.

(21) Appl. No.: 11/492,721

(22) Filed: Jul. 25, 2006

(65) Prior Publication Data

US 2008/0025268 A1  Jan. 31, 2008

(51) Int. Cl.
*H04W 84/12* (2009.01)
*H04B 7/04* (2006.01)
*H04L 12/801* (2013.01)
*H04W 72/10* (2009.01)

(52) U.S. Cl.
CPC .............. *H04B 7/0417* (2013.01); *H04L 47/10* (2013.01); *H04W 72/10* (2013.01)
USPC ........... 370/338; 370/328; 370/329; 370/331; 370/341; 370/335; 455/509; 455/422.1; 455/436

(58) Field of Classification Search
CPC ...... H04B 7/0417; H04L 47/10; H04W 72/10
USPC ............ 455/435.2–435.3, 452.2, 456.2, 512, 455/450, 455, 516, 509; 370/328, 329, 469, 370/341, 437, 444, 468
See application file for complete search history.

(56) References Cited

U.S. PATENT DOCUMENTS

2003/0103571 A1 * 6/2003 Meehan et al. .......... 375/240.27
2006/0092963 A1 * 5/2006 Bakre et al. ................... 370/437

FOREIGN PATENT DOCUMENTS

WO          03049449 A2       6/2003

OTHER PUBLICATIONS

Schurgers, C., et al., "Voice Over Wireless Internet: Performance Interaction of Signal Processing Algorithms and Network Protocols," 1999 IEEE 49th Vehicular Technology Conference, vol. 3, pp. 1935-1939.

(Continued)

*Primary Examiner* — Babar Sarwar
(74) *Attorney, Agent, or Firm* — Garlick & Markison; Bruce E. Garlick

(57) ABSTRACT

Aspects of a method and system for content-aware mapping/error protection using different spatial streams are presented. Aspects of a system for handling multimedia information in a communication system may include a transmitter that enables control of a MAC layer and/or a PHY layer, in a wireless communication device to wirelessly communicate different portions of multimedia information via different spatial streams based on content of the multimedia information. The system may also comprise a processor that enables definition of a plurality of priority classes based on the content associated with at least a portion of the multimedia information.

18 Claims, 5 Drawing Sheets

(56) References Cited

OTHER PUBLICATIONS

Pei Y, et al., "Multi-Layered Video Transmission Over Wireless Channels Using an Adaptive Modulation and Coding Scheme," 2001 International Conference on Image Processing, Oct. 7, 2001.
Ghandi et al., "Unequally Error Protected Data Partitioned Video with Combined Hierarchical Modulation and Channel Coding," 2006 IEEE International Conference on Toulouse, May 14, 2006.
Amine Bouabdallah et al., "Dependency-aware Unequal Erasure Protection Codes," Journal of Zhejiang University Science, Jan. 1, 2006.
Andres Albanese et al., "Priority Encoding Transmission," IEEE Transactions on Information Theory, Nov. 1, 1996.
European Search Report: EP07005956 dated Jul. 6, 2012, 9 pages.

* cited by examiner

METHOD AND SYSTEM FOR CONTENT-AWARE MAPPING/ERROR PROTECTION USING DIFFERENT SPATIAL STREAMS

CROSS-REFERENCE TO RELATED APPLICATIONS/INCORPORATION BY REFERENCE

This application makes reference to:
U.S. application Ser. No. 11/492,667 filed on even data herewith;
U.S. application Ser. No. 11/492,391 filed on even date herewith;
U.S. application Ser. No. 11/492,381 filed on even date herewith; and
U.S. application Ser. No. 11/492,390 filed on even date herewith.

Each of the above stated applications is hereby incorporated herein by reference in its entirety.

FIELD OF THE INVENTION

Certain embodiments of the invention relate to data communications. More specifically, certain embodiments of the invention relate to a method and system for content-aware mapping/error protection using different spatial streams.

BACKGROUND OF THE INVENTION

Multiple input multiple output (MIMO) systems are wireless communications systems that are specified in, for example, resolution 802.11n from the Institute of Electrical and Electronics Engineers (IEEE). A MIMO system that receives a signal Y may compute a channel estimate matrix, H, based on the received signal. The signal may comprise information generated from a plurality of information sources. A transmitting MIMO system may utilize a plurality of transmitting antennas when transmitting the signal Y. A receiving MIMO system may utilize a plurality of receiving antennas when receiving the signal Y. The channel estimate matrix for a downlink RF channel, $H_{down}$, may describe a characteristic of the wireless transmission medium in the transmission path from a transmitter, to a receiver. The channel estimate for an uplink RF channel, $H_{up}$ may describe a characteristic of the wireless transmission medium in the transmission path from the receiver to the transmitter. According to the principle of reciprocity, a characteristic of the wireless transmission medium in the transmission path from the transmitter to the receiver may be assumed to be identical to a corresponding characteristic of the wireless transmission medium in the transmission path from the receiver to the transmitter.

When the transmitter and receiver are MIMO systems, corresponding beamforming matrices may be configured and utilized for transmitting and/or receiving signals based on the characteristic channel estimate matrix H. Beamforming is a method for signal processing that may allow a transmitting MIMO system to combine a plurality of signals in a transmitted signal Y. Beamforming is also a method for signal processing that may allow a receiving MMO system to separate individual signals in a received signal Y.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for content-aware mapping/error protection using different spatial streams, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for content-aware mapping/error protection using different spatial streams. Aspects of a system for handling multimedia information in a communication system may comprise a transmitter that enables control of a MAC layer and/or a PHY layer, in a wireless communication device to wirelessly communicate different portions of multimedia information via different spatial streams based on content of the multimedia information. The system may also comprise a processor that enables definition of a plurality of priority classes based on the content associated with at least a portion of the multimedia information.

Figure 1A:
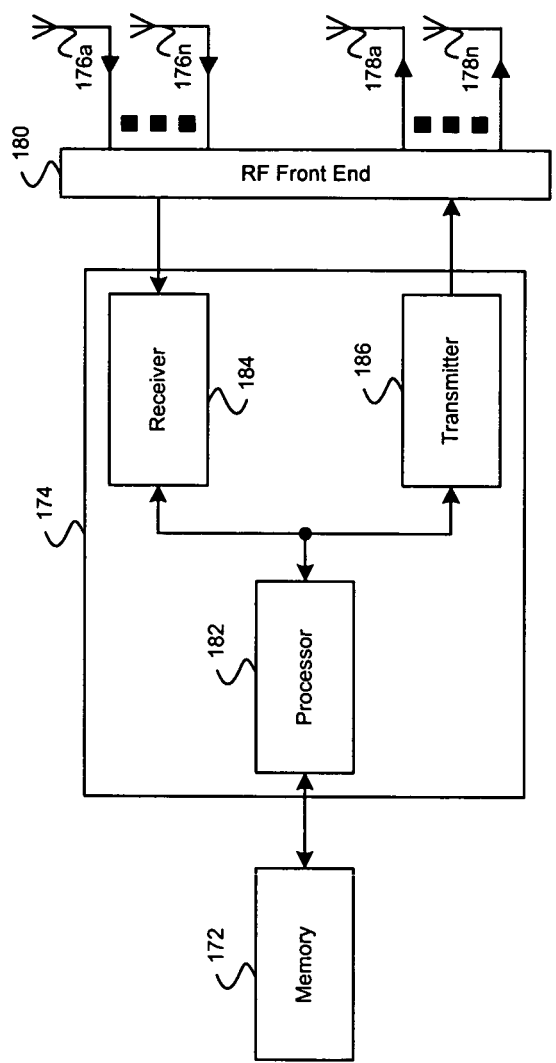
FIG. 1A is a block diagram of exemplary communications circuitry that may be utilized in connection with an embodiment of the invention.

FIG. 1A is a block diagram of exemplary communications circuitry that may be utilized in connection with an embodiment of the invention. With reference to FIG. 1A, there is shown a memory processor 172, a transceiver 174, an RF front end 180, a plurality of receive antennas 176a, ..., 176n, and a plurality of transmitting antennas 178a, ..., 178n. The transceiver 174 may comprise a processor 182, a receiver 184, and a transmitter 186.

The memory 172 may enable storage and/or retrieval of information that may be transmitted via one or more transmitting antennas 178a, ..., 178n, received via one or more receive antennas 176a, ..., 176n, and/or storage of code that may enable control of the operation of the transceiver 174.

The processor 182 may enable digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions.

The receiver 184 may be enable digital receiver functions that may comprise, but are not limited to, fast Fourier transform processing, beamforming processing, equalization, demapping, demodulation control, deinterleaving, depuncture, and decoding. The transmitter 186 may enable digital transmitter functions that comprise, but are not limited to, coding, puncture, interleaving, mapping, modulation control, inverse fast Fourier transform processing, beamforming processing. The RF front end 180 may enable reception of analog RF signals via antennas 176a, . . . , 176n, converting the RF signal to baseband, and generating digital representations of the received analog baseband signals. The digital representation may be a complex quantity comprising I and Q components. The RF front end 180 may also transmit analog RF signals via an antenna 178a, . . . , 178n, converting a digital baseband signal to an analog RF signal.

In operation, the processor 182 may receive data from the receiver 184. The processor 182 may store received data to the memory 172 for subsequent analysis and/or processing. The processor 182 may retrieve information from the memory 172. The retrieved information may be transmitted via an RF channel by the transmitter 186. The processor 182 may associate one or more priority classes to the retrieved information. The transmitter 186 may process and transmit the information via the RF channel based on the corresponding priority classes.

Figure 1B:
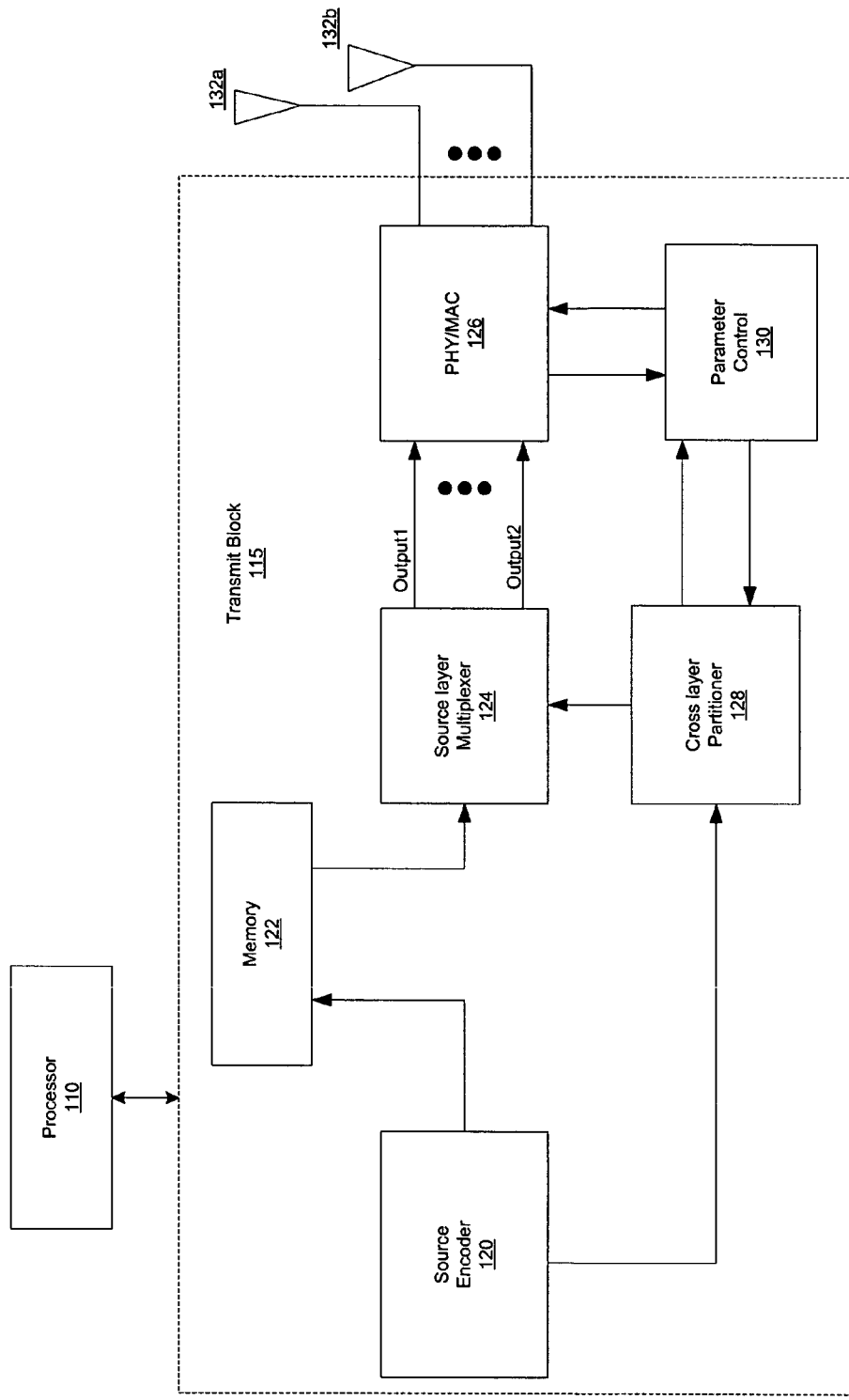
FIG. 1B illustrates an exemplary architecture for source layer optimization for transmitting data, in accordance with an embodiment of the invention.

FIG. 1B illustrates an exemplary architecture for source layer optimization for transmitting data, in accordance with an embodiment of the invention. Referring to FIG. 1B, there is shown a processor 110 and a transmit block 115. The transmit block 115 may comprise a source encoder block 120, a memory block 122, a source layer multiplexer block 124, a PHY/MAC block 126, a cross-layer partitioner block 128, a parameter control block 130, and transmit antennas 132a, . . . , 132b.

The source encoder block 120 may comprise suitable logic, circuitry, and/or code that may be utilized to enable compression of data prior to transmission. For example, the compressed data may be video data in MPEG-4 format. The source encoder block 120 may also communicate information about the compressed data to the cross-layer partitioner block 128. The information communicated may relate to the type of compression. For example, if the compressed data comprises video data, the source encoder block 120 may communicate the specific type of compression, such as MPEG-1, MPEG-2, MPEG-4, H.261, H.263, or H.264. The source encoder block 120 may also communicate the type of chroma subsampling used, such as, for example, 4-4-4, 4-2-2, or 4-2-0 chroma subsampling.

The source layer multiplexer block 124 may comprise suitable logic, circuitry, and/or code that may be utilized to enable reading data from, for example, the memory block 122 and communicating various portions of the data to the PHY/MAC 126. The data may be split into the various portions according to information from the cross-layer partitioner block 128. The information from the cross-layer partitioner block 128 may comprise, for example, priority for the various portions of the data. The cross-layer partitioner block 128 may also indicate that portions of data with certain priority may be communicated via certain outputs of the source layer multiplexer block 124.

The PHY/MAC block 126 may comprise suitable logic, circuitry, and/or code that may be utilized to enable conversion of input data in a digital format to output suitably modulated analog data ready for transmission. For example, the PHY/MAC block 126 may apply a FEC code to the digital data. The PHY/MAC block 126 may also apply a specific RF modulation to the analog signal, which may have been converted from the digital data. The PHY/MAC block 126 may additionally communicate analog signals to different transmit antennas 132a, . . . , 132b, in a part of a multiple-input multiple-output (MIMO) architecture.

In an embodiment of the invention, the PHY/MAC block 126 may receive one or more streams of digital data. The PHY/MAC block 126 may then operate on the multiple streams as indicated by, for example, the parameter control block 130. Accordingly, the PHY/MAC block 126 may, for example, apply a specific FEC code to each digital stream. Each digital stream may then be converted to analog RF signal, which may be modulated by a specific RF modulation scheme. Each modulated RF signal may then be communicated to one or more antennas to be transmitted.

The cross-layer partitioner block 128 may comprise suitable logic, circuitry, and/or code that may be utilized to enable assigning a priority to portions of data in the memory block 122. The priority may be based on, for example, perceived importance of the information in the memory block 122. For example, if the data in the memory block 122 comprises video data relating to video frames, a portion of the data that comprises information about an entire frame, such as, example, an I-frame, may have a high priority. Other frames, such as, for example, P-frames may have a lower priority than I-frames since P-frames may depend on the I-frames for additional information. P-frames that depend on other primary P-frames may be, for example, assigned a lower priority than the P-frames that may only depend on I-frames. A B-frame that depends on a prior and a subsequent frame may be assigned, for example, a lowest priority. The number of priorities may be design and/or implementation dependent.

The cross-layer partitioner block 128 may also indicate to the source layer multiplexer block 124 that data with certain priorities may be communicated to the PHY/MAC block 126 via specific outputs of the source layer multiplexer block 124. The cross-layer partitioner block 128 may then communicate to the parameter control block 130 those operations that may be performed on the various streams of data communicated by the source layer multiplexer 124.

Specific streams of data may be communicated to specific transmit antennas. The cross-layer partitioner block 128 may have information regarding the propagation path from each transmit antenna 132a, . . . , 132b to a receive antenna, where data transmitted via one transmit antenna may be received with fewer bit errors, for example, than data transmitted by another transmit antenna. Accordingly, this information may be used to determine which data may be transmitted via which transmit antenna. The information regarding the propagation path for each transmit antenna may be generated, for example, from feedback information from the receiving devices. Alternatively, the information may be generated from feedback information from a receiver co-located with the transmit block 115.

The parameter control block 130 may comprise suitable logic, circuitry, and/or code that may be utilized to enable controlling of various operations to the digital data in the PHY/MAC block 126. For example, the parameter control block 130 may determine the FEC code and/or the RF modulation that may be used by the PHY/MAC block 126 for specific portions of data. The parameter control block 130 may also determine which antennas may be used to transmit which portions of data by controlling routing of the data within the PHY/MAC block 126 to the specific antennas.

However, there may be other embodiments of the invention that route signals to specific antennas using other methods. For example, some embodiments of the invention may select the antenna used to transmit data by selecting the source layer multiplexer 124 output used to communicate data from the source layer multiplexer 124 to the PHY/MAC 126. Data communicated to the PHY/MAC 126 via specific outputs to the PHY/MAC 126 may be transmitted via specific transmit antennas. For example, the data, Output1, may be transmitted by the transmit antenna 132a, and the data, Output2, may be transmitted by the transmit antenna 132b.

In operation, the source encoder block 120 may compress data and store the compressed data in the memory block 122. For simplicity, the data may be assumed to be video data compressed using the MPEG-4 format, two priority classes may be used—a high priority class and a low priority class, and Output1 data and Output2 data may be transmitted by the transmit antennas 132a and 132b, respectively. The source encoder block 120 may communicate to the cross layer partitioner block 128 that the compressed data is video data using the MPEG-4 format. The source encoder block 120 may also communicate, for example, start and end memory addresses for the stored video data corresponding to a frame, the frame number, and the type of frame that may be stored. The type of frame may be, for example, I-frame, P-frame, and B-frame. Other information may also be communicated, such as, for example, the chroma sub-sampling format.

The cross layer partitioner block 128 may then determine a priority to assign to each frame. An exemplary priority class algorithm may assign a high priority for all I-frames and a low priority for all other frames. The priority for the video data in the memory block 122 may be communicated to the source layer multiplexer block 124. The source layer multiplexer 124 may read data from the memory block 122, and may output, for example, high priority data as Output1 and the low priority data as Output2.

The cross layer partitioner block 128 may also communicate to the parameter control block 130 the operations to be applied to each stream of data, namely, Output1 and Output2. For example, the parameter control block 130 may indicate that the high priority data, Output1, may have applied to it a forward error correction (FEC) code A that may have a greater overhead in the number of bits used than a FEC code B. However, using the FEC code A may allow a receiving unit to correct a larger number of faulty bits than when using the FEC code B.

The cross layer partitioner block 128 may also communicate to the parameter control block 130 to use, for example, quadrature phase shift keying (QPSK) RF modulation rather than 16 quadrature amplitude modulation (16 QAM) RF modulation for the high priority data Output1. The QPSK RF modulation may have a smaller data throughput than the 16 QAM RF modulation, however, the QPSK RF modulation may be more reliable for a given transmission environment. Additionally, the transmit antenna 132a may exhibit more reliable transmission characteristics than the transit antenna 132b. If the transmission environment changes such that the transmit antenna 132b exhibits a more reliable transmission characteristics than the transmit antenna 132a, then the cross layer partitioner block 128 may indicate that the higher priority data be output as Output2.

The cross layer partitioner block 128 may also take into account feedback information from the receiving device to maximize throughput for transmission of the high priority and low priority data. This may allow, for example, the cross layer partitioner block 128 to select from a plurality of FEC codes and from a plurality of RF modulation schemes for a plurality of priority classes. Similarly, MIMO transmission may utilize beamforming, in which one antenna may be selected for transmission of particular stream of data, or a plurality of antennas may be selected for transmission of a particular stream of data.

Although feedback information from a receiving device may be used for transmission, the invention need not be so limited. For example, feedback data from a receiver that is co-located with the transmitting device may also be used. Accordingly, for example, the processor 110 may communicate the feedback data and/or instructions to the transmit block 115. For example, the processor 110 may process the feedback data from a co-located receiving device, and communicate information to the transmit block 115. The information may be used, for example, to control the operations on the data streams by the PHY/MAC block 126.

U.S. application Ser. No. 11/327,690 filed Jan. 6, 2006, provides a detailed description of feedback in a MIMO system, which is hereby incorporated herein by reference in its entirety.

Although an embodiment of the invention may have been described using a plurality of blocks, the invention need not be so limited. Accordingly, other embodiments of the invention may use different blocks that may encompass various functionalities.

Figure 2:
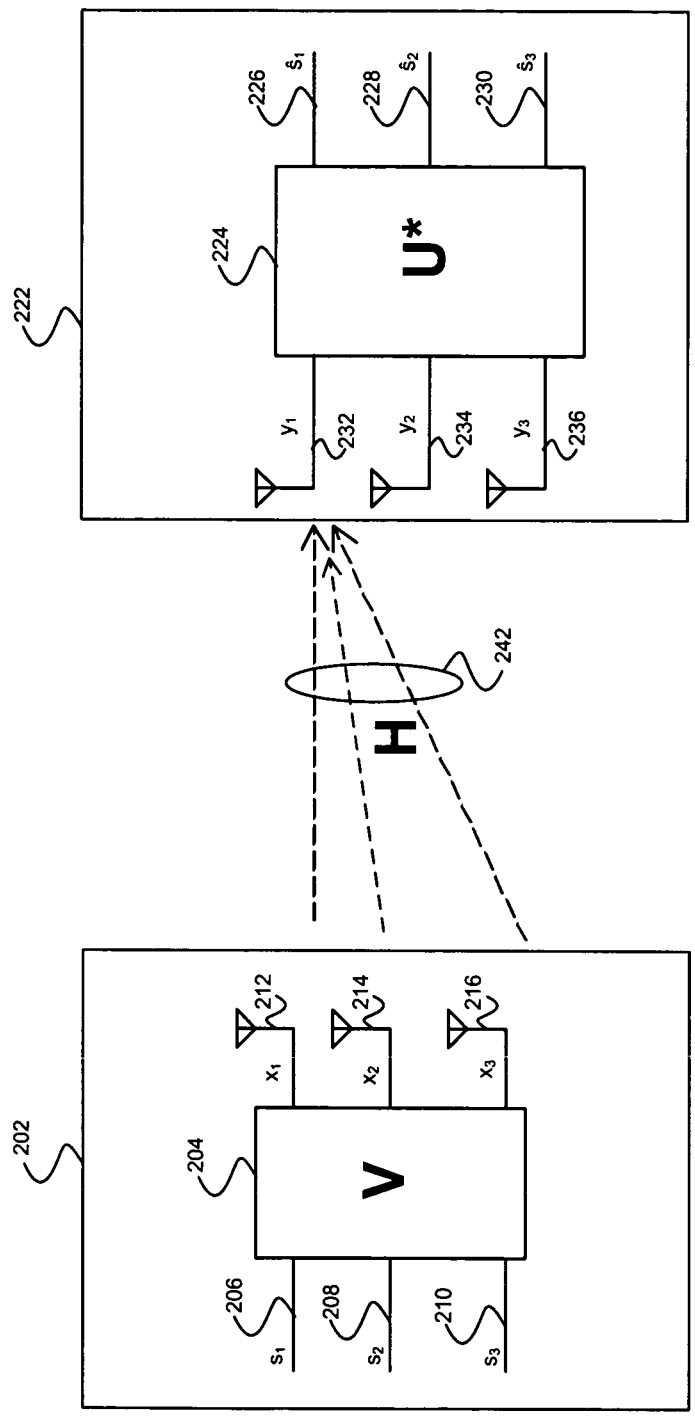
FIG. 2 is an exemplary diagram illustrating beamforming that may be utilized in connection with an embodiment of the invention.

FIG. 2 is an exemplary diagram illustrating beamforming that may be utilized in connection with an embodiment of the invention. Referring to FIG. 2 there is shown a transmitting mobile terminal 202, a receiving mobile terminal 222, and a plurality of RF channels 242. The transmitting mobile terminal 202 comprises a beamforming V matrix block 204, a first source signal s, 206, a second source signal $s_2$ 208, a third source signal $s_3$ 210, and a plurality of transmitting antenna 212, 214, and 216. The receiving mobile terminal 222 comprises a beamforming U* matrix block 224, a first destination signal $\hat{s}_2$ 226, a second destination signal $\hat{s}_2$ 228, a third destination signal $\hat{s}_3$ 230, and a plurality of receiving antenna 232, 234, and 236.

In operation, the transmitting antenna 212 may enable transmission of a signal $x_1$, the transmitting antenna 214 may enable transmission of a signal $x_2$, and the transmitting antenna 216 may enable transmission of a signal $x_3$. In a beamforming operation, each of the transmitted signals $x_1$, $x_2$, and $x_3$ may be a function of a weighted summation of at least one of the plurality of the source signals $s_1$, $s_2$, and $s_3$. The weights may be determined by the beamforming V matrix such that:

$$X = VS \qquad \text{equation [1a]}$$

where X may be a 3×1 vector representation of the transmitted signals $x_1$, $x_2$, and $x_3$, for example:

$$X = \begin{bmatrix} x_1 \\ x_2 \\ x_3 \end{bmatrix} \qquad \text{equation [1b]}$$

S may be a 3×1 vector representation of the source signals $s_1$, $s_2$, and $s_3$, for example:

$$S = \begin{bmatrix} s_1 \\ s_2 \\ s_3 \end{bmatrix} \quad \text{equation [1c]}$$

and V may be a 3×3 matrix representation of the beamforming V matrix, for example:

$$V = \begin{bmatrix} v_{11} & v_{12} & v_{13} \\ v_{21} & v_{22} & v_{23} \\ v_{31} & v_{32} & v_{33} \end{bmatrix} \quad \text{equation [1d]}$$

The receiving antenna 232 may receive a signal $y_1$, the receiving antenna 234 may receive a signal $y_2$, and the receiving antenna 236 may receive a signal $y_3$. The plurality of RF channels 242 may be characterized mathematically by a transfer coefficient matrix H. The transfer coefficient matrix H may also be referred to as a channel estimate matrix.

The plurality of received signals $y_1$, $y_2$, $y_3$, may be expressed as a function of the plurality of transmitted signals $x_1$, $x_2$, $x_3$, and the transfer coefficient matrix H in the following equation, for example:

$$Y = HX \quad \text{equation [2a]}$$

where Y may be a 3×1 vector representation of the received signals $y_1$, $y_2$, and $y_3$, for example:

$$Y = \begin{bmatrix} y_1 \\ y_2 \\ y_3 \end{bmatrix} \quad \text{equation [2b]}$$

and H may be a 3×3 matrix representation of the transfer coefficient matrix, for example:

$$H = \begin{bmatrix} h_{11} & h_{12} & h_{13} \\ h_{21} & h_{22} & h_{23} \\ h_{31} & h_{32} & h_{33} \end{bmatrix} \quad \text{equation [2c]}$$

A representation for the transfer coefficient matrix H may be computed passed on the beamforming V matrix utilized in the transmitter 202, and the beamforming U* matrix utilized in the receive by applying a singular value decomposition (SVD) method. When utilizing SVD, the matrix H from may be represented as in the following equation:

$$H = UDV^* \quad \text{equation [3a]}$$
where
$$V^* = \frac{1}{V} \quad \text{equation [3b]}$$
and
$$U = \frac{1}{U^*} \quad \text{equation [3b]}$$

based on the unitary matrix properties of the beamforming matrices V and U*. For a given matrix M, the matrix M* may represent an Hermitian transform for the matrix M. The matrix D may comprise a plurality of nonzero matrix diagonal elements, the values of which may correspond to at least a portion of singular values associated with the matrix H as shown in the following equation, for example:

$$D = \begin{bmatrix} \lambda_{1,1} & 0 & \cdots & 0 \\ 0 & \lambda_{2,2} & 0 & 0 \\ \vdots & 0 & \ddots & 0 \\ 0 & 0 & \cdots & \lambda_{A,A} \end{bmatrix} \quad \text{equation [4]}$$

where $\lambda_{i,i}$ may represent singular values associated with the matrix H, and the index A may represent a value equal to the lesser value between a number of transmitting antennas at the transmitter 202, and a number of receiving antennas at the receiver 222.

The beamforming operation at the transmitter 202 may be represented by equation[1a]. Based on equations[1a] and [2a], the received signal vector Y may be represented based on the source signal vector S as follows:

$$Y = H \times VS \quad \text{equation [5]}$$

At the receiver 222, the received destination signals $\hat{s}_1$ 226, $\hat{s}_2$ 228, and $\hat{s}_3$ 230 may be expressed as a function of the received signal vector Y, and the beamforming matrix U* as in the following equation:

$$\hat{S} = U^* Y \quad \text{equation [6a]}$$

where $\hat{S}$ may be a 3×1 vector representation for the received destination signals $\hat{s}_1$ 226, $\hat{s}_2$ 228, and $\hat{s}_3$ 230. Based on equations[3a] and [5], the received destination signals may be expressed as a function of the source signals as in the following equation:

$$\hat{S} = U^* UDV^* VS \quad \text{equation [6b]}$$
or
$$S = D \times S \quad \text{equation [6c]}$$

Based on equation[6c], a received destination signal $\hat{s}_i$ may be proportional to the corresponding source signal $s_i$, where i is an index to one of the plurality of corresponding signals, as in the following equation:

$$\hat{s}_i = \lambda_{i,i} s_i \quad \text{equation [7]}$$

where $A_{i,i}$ may represent a corresponding value from the diagonal vector D as in equation[4]. The singular value A,i may represent a measure of signal gain between the transmitter 202 and the receiver 222. Singular values from the diagonal vector D, in equation[4], may be sorted based on the following relationship, for example:

$$\lambda_{11} \geq \lambda_{22} \geq \ldots \lambda_{(A-1)(A-1)} \geq \lambda_{AA} \quad \text{equation [8]}$$

where and the index A may represent a value equal to the lesser value between a number of transmitting antennas at the transmitter 202, and a number of receiving antennas at the receiver 222.

Correspondingly, based on signal to noise ratio (SNR) and/or signal strength measurements, for the destination signals may similarly be sorted based on the following relationship, for example:

$$\hat{s}_1 \geq \hat{s}_2 \geq \ldots \geq \hat{s}_{N_{SS}-1} \geq \hat{s}_{N_{SS}} \quad \text{equation [9]}$$

where $N_{SS}$ may represent a number of source signals at the receiver 202.

The equation[9] may present a signal strength relationship among the destination signals such that destination signal 226 may represent a stronger signal in comparison to destination signal 228, while destination signal 228 may represent a stronger signal in comparison to the destination signal 230, for example.

Figure 3:
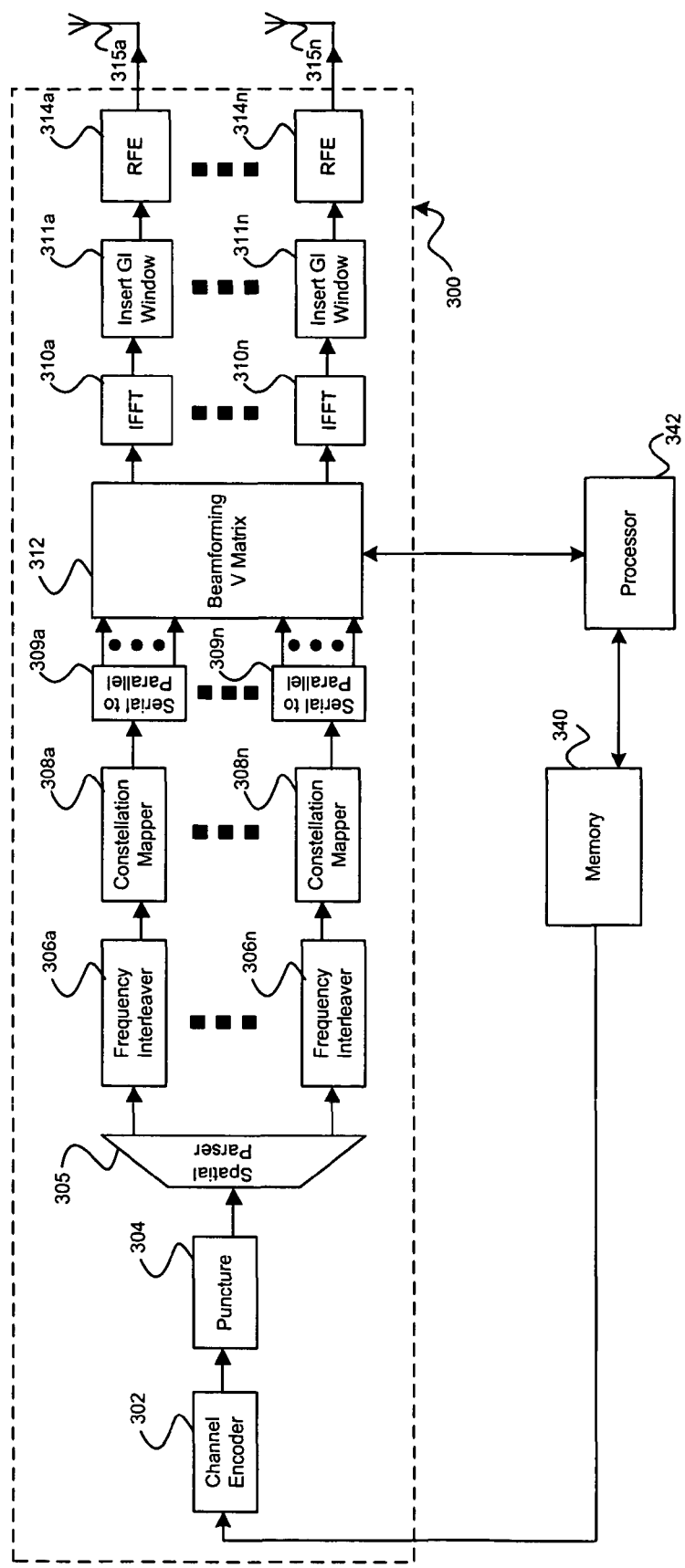
FIG. 3 is a block diagram of an exemplary MIMO transmitter system for content aware mapping and error protection using different spatial streams, in accordance with an embodiment of the invention.

FIG. 3 is a block diagram of an exemplary MIMO transmitter system for content aware mapping and error protection using different spatial streams, in accordance with an embodiment of the invention. Referring to FIG. 3, there is shown a transmitter 300, a processor 342, a memory 340, and a plurality of transmitting antennas 315a, . . . , 315n. The transmitter 300 may comprise a channel encoder block 302, a puncture block 304, spatial parser block 305, a plurality of frequency interleaver blocks 306a, . . . , 306n, a plurality of constellation mapper blocks 308a, . . . , 308n, a plurality of serial to parallel converter blocks 309a, . . . , 309n, a beamforming V matrix block 312, a plurality of inverse fast Fourier transform (IFFT) blocks 310a, . . . , 310n, a plurality of insert guard interval (GI) window blocks 311a, . . . , 311n, and a plurality of radio front end (RFE) blocks 314a, . . . , 314n.

The channel encoder block 302 may comprise suitable logic, circuitry, and/or code that may enable transformation of received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate, R, may be specified using the notation $i_b/t_b$, where $t_b$ represents the total number of bits that comprise a coding group of bits, while $i_b$ represents the number of information bits that are contained in the group of bits $t_b$. Any number of bits $t_b-i_b$ may represent redundant bits that may enable the receiver 184 to detect and correct errors introduced during transmission of information from the transmitter 302 to the receiver 322 via a wireless communication medium 242, for example. Increasing the number of redundant bits may enable greater capabilities at the receiver to detect and correct errors in received information bits. Increasing the number of redundant bits may increase the value of $t_b$ without increasing the number of information bits $i_b$, and correspondingly reduce the coding rate, R. The resulting lower coding rate, R, may be referred to as a "stronger" coding rate in comparison to a higher coding rate, R. The stronger coding rate may also correspond to a stronger error protection scheme. The stronger error protection scheme may correspondingly enable greater capabilities at the receiver to detect and correct errors in received information bits. Decreasing the number of redundant bits may decrease the value of $t_b$ without decreasing the number of information bits $i_b$, and correspondingly increase the coding rate, R. The resulting higher coding rate, R, may be referred to as a "weaker" coding rate in comparison to a lower coding rate, R.

The invention is not limited to BCC, and any one of a plurality of coding techniques, for example, Turbo coding, low density parity check (LDPC) coding, or various block coding techniques such as Reed-Solomon FEC may also be utilized.

The puncture block 304 may comprise suitable logic, circuitry, and/or code that may enable alteration of a coding rate for received encoded data by removing redundant bits from the received transformed binary input data blocks. For example, for each contiguous block of 4 bits of received data that is encoded based on an R=½ coding rate BCC, the received data may comprise 2 information bits, and 2 redundant bits. By removing 1 of the redundant bits in the group of 4 received bits, the puncture block 304 may alter the coding rate from R=½ to R=⅔, for example.

The spatial parser block 305 may comprise suitable logic, circuitry, and/or code that may enable a block of data bits associated with a single bit stream to be divided into a plurality of parsed blocks of data bits, each of which may be associated with a corresponding plurality of parsed bit streams. Each of the parsed bit streams may be referred to as a spatial stream. A spatial stream may comprise an identifiable block of bits that may be processed within a MIMO system.

The spatial parser block 305 may receive the block of data bits associated with the single bit stream, $b_{db}$, and generate a plurality of parsed bit streams, $b_{st}[i]$, where i may be an index identifying a specific parsed bit stream among the plurality of parsed bit streams. The range of values for the index i may be represented as follows:

$$0 \leq i \leq N_{SS}-1 \qquad \text{equation [10]}$$

where $N_{SS}$ may represent a number of spatial streams, for example $N_{SS}=2$ may indicate a MIMO system that comprises 2 spatial streams.

Each of the parsed bit streams, $b_{st}[i]$, may comprise a portion of the bits contained in the single bit stream $b_{db}$. The single bit stream $b_{db}$ may comprise the plurality of bits collectively contained in the corresponding plurality of parsed bit streams $b_{st}[i]$.

Various embodiments of the invention may not be limited to a specific method for allocating bits from a single bit stream to a plurality of spatial streams. For example, given a block of $N_{TOT}$ bits received in a from a single bit stream, the spatial parser block 305 may assign about $N_{TOT}/N_{SS}$ bits to each of the plurality of $N_{SS}$ spatial streams. A first block of $N_{TOT}/N_{SS}$ bits from the bit stream $b_{db}$ may be assigned to spatial stream 1, a second block of $N_{TOT}/N_{SS}$ bits may be assigned to spatial stream 2, and an $N_{SS}^{th}$ block of $N_{TOT}/N_{SS}$ bits may be assigned to spatial stream $N_{SS}$, for example. Alternatively, a $k^{th}$ bit from the bit stream $b_{db}$, where k may represent an index for a bit in the block of data bits associated with the bit stream $b_{db}$, may be assigned to spatial stream i as indicated in the following equation, for example:

$$k_i = \text{floor}(k/N_{SS}) + k \bmod(N_{SS}) \qquad \text{equation [11]}$$

where $k_i$ may represent an index for a bit assigned to the $i^{th}$ spatial stream, floor(x) may represent an integer value that is not larger than the value x, and y mod(x) may represent the modulus x value for y.

The frequency interleaver block 306a may comprise suitable logic, circuitry, and/or code that may enable a rearrangement of an order of bits among a block of bits associated with a received spatial stream. The frequency interleaver block 306a may utilize a plurality of permutations when rearranging the order of bits among a block of bits associated with a received spatial stream. After rearrangement, the interleaved block of bits associated with the $i^{th}$ spatial stream, $b_{st}[i]^{int}$, may be divided into a plurality of sub-blocks, $b_{sub}[f]$, where the index f may represent a frequency. The frequency may correspond to one of a plurality of frequency carriers that may be utilized to transmit a representation of the bits contained in the sub-block via a wireless communication medium, for example. The representation of the bits may be referred to as a symbol. Each sub-block, $b_{sub}[f]$, may comprise a portion of bits in the block $b_{st}[i]^{int}$. The block of bits $b_{st}[i]^{int}$ may comprise the plurality of bits collectively contained in the corresponding plurality of sub-blocks $b_{sub}[f]$.

The frequency interleaver block 306n may comprise suitable logic, circuitry, and/or code that may enable a rearrangement of an order of bits among a block of bits associated with a received spatial stream, substantially as described for the frequency interleaver block 306a. In various embodiments of the invention, the number of frequency interleaver blocks 306a . . . 306n may equal the number of spatial streams, $N_{SS}$, for example.

The constellation mapper block 308a may comprise suitable logic, circuitry, and/or code that may enable a mapping of received bits, associated with a spatial stream, to one or more symbols. The received bits may be encoded based on an FEC, for example, and may be referred to as coded bits. The constellation mapper block 308a may receive one or more coded bits, $b_{sym}[f]$, and generate the symbol, sym[f], based on a modulation type associated with the spatial stream. The number of coded bits associated with $b_{sym}[f]$ may be determined based on the modulation type. The representation of the symbol, sym[f], may be a complex quantity comprising in-phase (I) and quadrature (Q) components. Each symbol, sym[$f_k$], associated with the one or more coded bits $b_{sym}[f_k]$ may be associated with a frequency carrier, $f_k$, where k may be an index that identifies a frequency associated with a $k^{th}$ frequency carrier, utilized for transmitting a representation of the symbol via the wireless communication medium.

Exemplary modulation types may comprise binary phase shift keying (BPSK), Quadra phase shift keying (QPSK), 16 level QAM (16 QAM), 64 level QAM (64 QAM), and 256 level QAM (256 QAM). For the BPSK modulation type, the number of coded bits associated with a symbol may be represented: $b_{sym}[f_k]=1$, for each frequency carrier $f_k$. For the QPSK modulation type, the number of coded bits associated with a symbol may be represented: $b_{sym}[f_k]=2$, for each frequency carrier $f_k$. For the 16 QAM modulation type, the number of coded bits associated with a symbol may be represented: $b_{sym}[f_k]=4$, for each frequency carrier $f_k$. For the 64 QAM modulation type, the number of coded bits associated with a symbol may be represented: $b_{sym}[f_k]=6$, for each frequency carrier $f_k$. For the 256 QAM modulation type, the number of coded bits associated with a symbol may be represented: $b_{sym}[f_k]=8$, for each frequency carrier $f_k$.

The spatial stream may comprise a plurality of frequency carriers, $N_{SD}$, for example a 20 MHz RF channel may comprise NSD=56 frequency carriers, $f_{-28}, f_{-27}, \ldots, f_{-1}, f_1, \ldots, f_{27}$, and $f_{28}$, that may be utilized for transmitting coded bits, while a 40 MHz RF channel may comprise $N_{SD}$=112 frequency carriers, $f_{-56}, f_{-55}, \ldots, f_{-1}, f_1, \ldots, f_{55}$, and $f_{56}$, that may be utilized for transmitting coded bits. In a MIMO system, the symbols sym[$f_{-28}$], sym[$f_{-27}$], . . . , sym[$f_{-1}$], sym[$f_1$], . . . , sym[$f_{27}$], and sym[$f_{28}$], or sym[$f_{-56}$], sym[$f_{-55}$], . . . , sym[$f_{-1}$], sym[$f_1$], . . . , sym[$f_{55}$], and sym[$f_{56}$], may be collectively referred to as an orthogonal frequency division multiplexing (OFDM) symbol. The number of coded bits associated with an OFDM symbol, $N_{CBPS}=N_{SD}*b_{sym}[f_k]$. The number of data bits associated with the OFDM symbol, $N_{DBPS}=R*N_{SD}*b_{sym}[f_k]$, where R may refer to the coding rate.

The constellation mapper block 308n may comprise suitable logic, circuitry, and/or code that may enable a mapping of received bits, associated with a spatial stream, to one or more symbols, substantially as described for the constellation mapper block 308a. In various embodiments of the invention, the number of constellation mapper blocks 308a . . . 308n may equal the number of spatial streams, $N_{SS}$, for example.

The serial to parallel block 309a may comprise suitable logic, circuitry, and/or code that may enable serial reception of a plurality of bits, and subsequent simultaneous output of the serially received plurality of bits. The serial to parallel block 309a may comprise suitable memory, latches, and/or registers to enable the serial to parallel function.

The serial to parallel block 309n may comprise suitable logic, circuitry, and/or code that may enable serial reception of a plurality of bits, and subsequent simultaneous output of the serially received plurality of bits, substantially as described for the serial to parallel block 309a. In various embodiments of the invention, the number of serial to parallel blocks 309a . . . 309n may equal the number of spatial streams, $N_{SS}$, for example.

The beamforming V matrix block 312 may comprise suitable logic, circuitry, and/or code that may enable processing of a received plurality of spatial streams, generation of a corresponding plurality of signals that may be simultaneously transmitted by a MIMO transmitter 202, whereby a MIMO receiver 222 may receive the information contained in the plurality of spatial streams. Each of the generated corresponding plurality of signals may comprise at least one weighted sum of at least a portion of the received plurality of spatial streams. A weighted sum may be computed corresponding to each of the plurality of frequency carriers, $f_k$. The beamforming V matrix block 312 may generate the corresponding plurality of signals based on a beamforming matrix V.

The beamforming V matrix block 312 may receive a plurality of spatial streams, $s_i$, where i may represent an index that indicates an $i^{th}$ spatial stream. Each of the spatial streams may comprise a plurality of frequency components, $s_i[f_k]$, which correspond to each of the plurality of $N_{SD}$ frequency carriers associated with the spatial stream $s_i$. The plurality of spatial streams may be represented by a plurality of matrices $S_s[f_k]$ as in the following equation:

$$S_s[f_k] = \begin{bmatrix} s_0[f_k] \\ s_1[f_k] \\ \vdots \\ s_{N_{ss}-1}[f_k] \end{bmatrix} \quad \text{equation [12]}$$

where the frequency index k comprises values $-28 \leq k \leq 28$ for a 20 MHz RF channel, and $-56 \leq k \leq 56$ for a 40 MHz RF channel.

The beamforming V[$f_k$] matrix may comprise a plurality of beamforming factors, $V_{m,n}[f_k]$, where m represents a row index in the matrix, and n represents a column index. The beamforming $V_{m,n}[f_k]$ matrix may be represented as in the following equation:

$$V[f_k] = \begin{bmatrix} v_{0,0}[f_k] & v_{0,1}[f_k] & \cdots & v_{0,N_{ss}-1}[f_k] \\ v_{1,0}[f_k] & v_{1,1}[f_k] & \cdots & v_{1,N_{ss}-1}[f_k] \\ \vdots & \vdots & \vdots & \vdots \\ v_{N_{TX}-1,0}[f_k] & v_{N_{TX}-1,1}[f_k] & \cdots & v_{N_{TX}-1,N_{ss}-1}[f_k] \end{bmatrix} \quad \text{equation [13]}$$

where $N_{TX}$ represents the number of generated signals, and the frequency index k comprises values $-28 \leq k \leq 28$ for a 20 MHz RF channel, and $-56 \leq k < 56$ for a 40 MHz RF channel. A value $N_{TX}=3$ may indicate a MIMO transmitter 202 that generates 3 transmitted signals.

Based on the representations of the received plurality of spatial streams, and beamforming matrix, the plurality of generated signals, X[$f_k$], may be represented as in the following equation:

$$X[f_k] = V[f_k]S_S[f_k] \qquad \text{equation [14]}$$

where the frequency index k comprises values $-28 \leq k \leq 28$ for a 20 MHz RF channel, and $-56 \leq k \leq 56$ for a 40 MHz RF channel.

The IFFT block 310a may comprise suitable logic, circuitry, and/or code that may be utilized to enable conversion of a frequency domain representation of a signal X[f] to a time domain representation X(t). The corresponding time domain signal may comprise a plurality of OFDM symbols. An OFDM symbol may be computed based on application of an IFFT algorithm to the frequency components associated with the corresponding signal X[f]. For example a 64 point IFFT algorithm may be utilized by the IFFT block 310a when processing a 20 MHz RF channel, while a 128 point IFFT algorithm may be utilized when processing a 40 MHz RF channel. An exemplary method for OFDM symbol computation may be found in clause 17.3.5.9 from the IEEE standard 802.11a-1999 (R 2003).

The time domain representation X(t) may comprise time domain representations for a plurality of signals, $x_j(t)$, that may be transmitted simultaneously by a MIMO transmitter 202 as shown in the following equation:

$$X(t) = \begin{bmatrix} x_0(t) \\ x_1(t) \\ \vdots \\ x_{N_{TX}-1}(t) \end{bmatrix} \qquad \text{equation [15]}$$

Each of the plurality of signals $x_j(t)$ may comprise a plurality of OFDM symbols associated with an $j^{th}$ signal among a plurality of $N_{TX}$ simultaneously transmitted signals from a MIMO transmitter 302. The OFDM symbols transmitted within the $j^{th}$ signal, $x_j(t)$, among a plurality of $N_{TX}$ simultaneously transmitted signals may be transmitted serially in time. Each OFDM symbol may span a time duration, $T_{SYM}$, referred to as a symbol interval, for example $T_{SYM}=4$ μs.

The IFFT block 310n may comprise suitable logic, circuitry, and/or code that may be utilized to enable conversion of a frequency domain representation of a signal X[f] to a time domain representation X(t), substantially as described for the IFFT block 310a. In various embodiments of the invention, the number of IFFT blocks 310a . . . 310n may equal the number of generated signals $N_{TX}$, for example.

The insert GI window block 311a may comprise suitable logic, circuitry, and/or code that may be utilized to enable insertion of guard intervals in one of a plurality of signals $x_j(t)$ transmitted by a MIMO transmitter 302. The guard interval, $T_{GI}$, may represent a time interval between the end of a current OFDM symbol interval, and the beginning of a subsequent OFDM symbol interval. Subsequent to the end of a symbol interval associated with a current OFDM symbol may follow a guard interval time duration, $T_{GI}$, for example $T_{GI}=0.8$ μs. Following the guard interval time duration a subsequent symbol interval corresponding to a subsequent OFDM symbol may follow.

The insert GI window block 311n may comprise suitable logic, circuitry, and/or code that may be utilized to enable insertion of guard intervals in one of a plurality of signals $x_j(t)$ transmitted by a MIMO transmitter 302, substantially as described for the insert GI window block 311a. In various embodiments of the invention, the number of insert GI window blocks 311a . . . 311n may equal the number of generated signals, $N_{TX}$, for example.

The RFE block 314a may comprise suitable, logic, circuitry, and/or code that may be utilized to enable generation of an RF signal from a received generated signal. The RF block 314a may receive a generated baseband signal. The RFE block 314a may generate the RF signal by utilizing a plurality of frequency carrier signals to modulate the received baseband signal. The modulated signal may be transmitted via the antenna 315a. The RFE block 314a may be utilized to enable generation of a 20 MHz RF signal, or of a 40 MHz RF signal, for example.

The RFE block 314n may comprise suitable, logic, circuitry, and/or code that may be utilized to enable generation of an RF signal from a received generated signal, substantially as described for the RFE block 314a. The modulated signal generated by the RFE block 314n may be transmitted via the antenna 315n. In various embodiments of the invention, the number of RFE blocks 314a . . . 314n may equal the number of generated signals, $N_{TX}$, for example.

The processor 342 may comprise suitable logic, circuitry, and/or code that may be utilized to enable a classification of source information bits. The processor 342 may enable the computation of values corresponding to beamforming factors, $V_{m,n}[f_k]$, based on the classification. The beamforming factor $V_{m,n}[f_k]$ may correspond to an $m^{th}$ transmitting antenna, and an $n^{th}$ spatial stream. The beamforming factors may determine a number of transmitting antennas 212, 214, 216 utilized, and at least one power level and/or phase, with which the spatial stream may be transmitted via a wireless medium from a transmitting MIMO system 202, to a receiving MIMO system 222. Based on the classification, source information bits may be assigned an nth spatial stream, wherein a beamforming factor $V_{m,n}[f_k]$ may be utilized when transmitting the source information via an $m^{th}$ transmitting antenna.

The processor 342 may also enable the transmitter 300 to perform transmitter functions in accordance with applicable communications standards. These function may comprise, but are not limited to, tasks performed at lower layers, for example physical layer (PHY) and medium access control (MAC) layer functions, in a relevant protocol reference model. These tasks may comprise physical layer functions, such as physical layer convergence protocol (PLCP), physical medium dependent (PMD), and/or associated layer management functions, for example. The processor 342 may also enable generation of source information bits and/or retrieval of stored source information that may be subsequently classified, coded, mapped, and transmitted via the wireless medium, for example.

The memory 340 may comprise suitable logic, circuitry, and/or code that may be utilized to enable storage and/or retrieval of information and/or a representation of the information, for example a binary representation comprising bits. The memory 340 may enable storage of source information bits. The stored source information bits may be assigned physical resources within the memory 340 for the storage. The stored source information bits may be subsequently available for retrieval. Retrieved source information bits may be output by the memory 340 and communicated to other devices, components, and/or subsystems that may be communicatively coupled, directly and/or indirectly, to the memory 340. The memory 340 may enable the stored source information bits to remain stored and/or available for subsequent retrieval until the resources allocated for the storage are deallocated. Physical resources may be deallocated based on a received instruction that the stored source information bits be erased from the memory 340, or based on a received instruction that the physical resources be allocated for the storage of subsequent binary information. The memory 340 may utilize a plurality of storage medium technologies such as volatile memory, for example random access memory (RAM), and/or nonvolatile memory, for example electrically erasable programmable read only memory (EEPROM).

In operation the processor 342 may enable the communication of instructions to the memory 340. The instructions may enable the retrieval of stored multimedia information from the memory 340. The multimedia information may comprise voice, video, and/or data information. The processor 342 may categorize the retrieved multimedia information based on content. For example, the retrieved multimedia information may be categorized by priority class, such as high priority, medium priority, or low priority.

In one exemplary embodiment of the invention, the retrieved multimedia information may comprise MPEG-1, or MPEG-2 encoded video information. The MPEG video information may be categorized based on whether the content is associated with an I-frame, a B-frame, or a P-frame, for example. I-frame information may be categorized as high priority, B-frame information may be categorized as medium priority, and P-frame information may be categorized as low priority, for example.

In another exemplary embodiment of the invention, the retrieved multimedia information may comprise MPEG-4 encoded information. The MPEG-4 encoded information may comprise a plurality of objects, and scene descriptor information that enables the plurality of objects to be arranged in one or more video frames, for example. The MPEG-4 encoded information may be categorized based on whether the content is scene descriptor information, a background object, or foreground object, for example. Scene descriptor information, and information relating to foreground objects may be categorized as high priority, and information relating to background objects may be categorized as low priority, for example.

The categorized retrieved multimedia information may be communicated by the memory 340 to the channel encoder block 302. The retrieved multimedia information may be communicated to the channel encoder block 302 as one or more binary input data blocks. Individual data blocks may be presented as input to the channel encoder blocks serially at distinct time instants. Each data block may comprise a plurality of bits. The bits contained within a given data block may be categorized to belong to a plurality of priority classes.

The spatial parser block 305 may parse the coded data block to generate a plurality of parsed data blocks. A parsed data block among the plurality of parsed data blocks may comprise at least a portion of the bits contained in the coded data block. A bit from the coded data block may be assigned to a given parsed data block based on the priority class associated with the bit. Each of the parsed data blocks generated from a coded data block may comprise spatial stream data that may be associated with a corresponding spatial stream. Each of the parsed data blocks may be associated with one of a plurality of spatial streams based on the corresponding priority class.

Any of the plurality of frequency interleaver blocks 306a . . . 306n may rearrange the order of bits in a received parsed data block for the corresponding spatial stream. Each of the frequency interleaver blocks 306a . . . 306n may generate an interleaved spatial stream block.

Any of the plurality of constellation mapper blocks 308a . . . 308n may map at least a portion of bits contained in a received interleaved spatial stream block to generate a symbol. Each of the constellation mapper blocks 308a . . . 308n may perform its respective mapping operation by utilizing a modulation type.

Any of the plurality of serial to parallel blocks 309a . . . 309n may convert a bit serial representation of the symbol, generated in the corresponding spatial stream, to a bit parallel symbol representation comprising a plurality of simultaneously output bits. Relating FIG. 2 to FIG. 3, the plurality of bit parallel symbol representations generated by the corresponding plurality of serial to parallel blocks 309a . . . 309n may correspond to the plurality of source signals 206, 208, and 210, as represented in equation[1c].

The beamforming V matrix 312 may perform beamforming to generate a plurality of transmit signals based on the received plurality of bit parallel symbols. The processor 342 may determine values for individual beamforming factors $V_{m,n}[f_k]$ for each of the frequency carriers associated with an RF channel. The values may be determined based on the priority class associated with the corresponding spatial stream. In various embodiments of the invention in which an SVD method is utilized, the values for individual beamforming factors $V_{m,n}[f_k]$ may be computed based on the relationship shown in equations[4] and [8], for example. In the various embodiments of the invention, there may be a plurality of diagonal matrices, which correspond to the plurality of frequency carriers associated with an RF channel as in the following equation:

$$D[f_k] = \begin{bmatrix} \lambda_{1,1}[f_k] & 0 & \cdots & 0 \\ 0 & \lambda_{2,2}[f_k] & 0 & \vdots \\ \vdots & 0 & \ddots & 0 \\ 0 & \cdots & 0 & \lambda_{A,A}[f_k] \end{bmatrix} \quad \text{equation [16]}$$

where the frequency index k comprises values $-28 \leq k \leq 28$ for a 20 MHz RF channel, and $-56 \leq k \leq 56$ for a 40 MHz RF channel.

In various embodiments of the invention, a signal strength measure may be associated with a spatial stream such that a given spatial stream may be referred to as being "stronger" than at least a portion of the remaining spatial streams among the plurality of spatial streams. The signal strength measure may correspond to values associated with the plurality of diagonal matrices as shown in equation[16], for example. The spatial streams may be associated with a corresponding signal strength measure, and at least a portion of the source information bit data may be assigned to one or more spatial streams based on the associated priority class. Data associated with higher priority classes may be assigned to stronger spatial streams, in comparison with data associated with lower priority classes, which may be assigned to weaker spatial streams, for example. Relating FIG. 2 to FIG. 3, the plurality of transmit signals generated by the beamforming V matrix 312 may correspond to the plurality of source signals $x_1$, $x_2$, and $x_3$, as represented in equation[1b].

Any among the plurality of IFFT blocks 310a . . . 310n may convert a frequency domain representation signal, generated for a corresponding transmit signal, to a corresponding time domain representation. Any of the plurality of insert GI window blocks 311a . . . 311n may insert guard intervals in a corresponding transmit signal. Any of the plurality of RFE blocks 314a . . . 314n may generate an RF signal, for a corresponding transmit signal, which may be transmitted via a wireless communications medium via a corresponding one of the plurality of transmitting antennas 315a . . . 315n.

Figure 4:
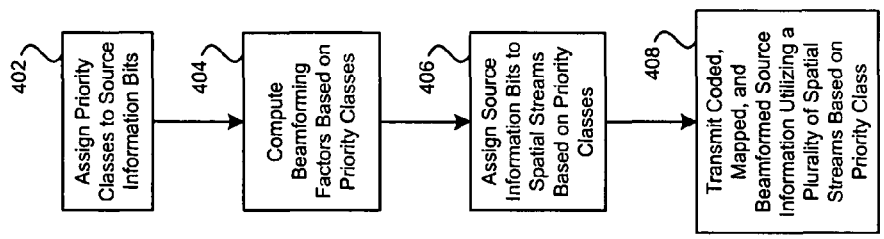
FIG. 4 is a flowchart illustrating exemplary steps for content aware mapping and error protection using different spatial streams, in accordance with an embodiment of the invention.

FIG. 4 is a flowchart illustrating exemplary steps for content aware mapping and error protection using different spatial streams, in accordance with an embodiment of the invention. Referring to FIG. 4, in step 402 a plurality of priority classes may be assigned to source information bits. The priority classes may be defined based on the content associated with the source information bits. In step 404, beamforming factors may be computed based on the plurality of priority classes. In step 406, source information bits maybe assigned to one of a plurality of spatial streams based on the plurality of priority classes. In step 408, coded, mapped, and beamformed source information bits may be transmitted by utilizing a plurality of spatial streams based on the assigned priority class.

Aspects of a system for handling multimedia information in a communication system may comprise a transmitter 300 that enables control of a MAC layer and/or a PHY layer, in a wireless communication device to wirelessly communicate different portions of multimedia information via different spatial streams based on content of the multimedia information. The system may also comprise a processor 342 that enables definition of a plurality of priority classes based on the content associated with at least a portion of the multimedia information.

In another aspect, the system may comprise a channel encoder 302 that enables coding of at least a portion of the multimedia information. The system may also comprise a spatial parser 305 that enables assignment of at least a portion of the coded portion of the multimedia information to one of the different spatial streams based on the corresponding one of the plurality of priority classes. The system may also comprise a plurality of constellation mappers 306a . . . 306n that enable mapping of the assigned portion or more of the coded portion or more of the multimedia information based on a modulation type.

In various embodiments of the invention, the processor 342 may enable computation of a plurality of multiplicative factors for a corresponding plurality of frequency carriers associated with at least a portion of the different spatial streams based on the plurality of priority classes. The multiplicative factors may comprise beamforming factors. The system may comprise a beamforming V matrix 312 that enables generation of a transmitted signal by combining at least a portion of the different spatial streams. The combining among the portions of the different spatial streams may be based on the plurality of priority classes.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling multimedia information in a communication system, the method comprising:
   controlling, in a wireless communication device, one or both of a MAC layer and/or a PHY layer, to wirelessly communicate different portions of multimedia information via different spatial streams based on content of said multimedia information by:
   defining a plurality of priority classes based on said content associated with at least a portion of said multimedia information; and
   generating a transmitted signal by combining at least a portion of said different spatial streams based on said plurality of priority classes.

2. The method according to claim 1, comprising coding said at least a portion of said multimedia information.

3. The method according to claim 2, comprising assigning at least a portion of said coded said at least a portion of said multimedia information to one of said different spatial streams based on said one of said plurality of priority classes.

4. The method according to claim 3, comprising mapping said assigned said at least a portion of said coded said at least a portion of said multimedia information based on a modulation type.

5. The method according to claim 1, comprising computing a plurality of multiplicative factors for a corresponding plurality of frequency carriers associated with at least a portion of said different spatial streams.

6. The method according to claim 5, wherein said plurality of multiplicative factors is computed based on said plurality of priority classes.

7. A non-transitory machine-readable storage having stored thereon, a computer program having at least one code section for handling multimedia information in a communication system, the at least one code section being executable by a machine for causing the machine to perform steps comprising:
   controlling in a wireless communication device, one or both of a MAC layer and/or a PHY layer, to wirelessly communicate different portions of multimedia information via different spatial streams based on content of said multimedia information by:
   defining a plurality of priority classes based on said content associated with at least a portion of said multimedia information; and
   generating a transmitted signal by combining at least a portion of said different spatial streams based on said plurality of priority classes.

8. The non-transitory machine-readable storage according to claim 7, comprising code for coding said at least a portion of said multimedia information.

9. The non-transitory machine-readable storage according to claim 8, comprising code for assigning at least a portion of said coded said at least a portion of said multimedia information to one of said different spatial streams based on said one of said plurality of priority classes.

10. The non-transitory machine-readable storage according to claim 9, comprising code for mapping said assigned said at least a portion of said coded said at least a portion of said multimedia information based on a modulation type.

11. The non-transitory machine-readable storage according to claim 7, comprising code for computing a plurality of multiplicative factors for a corresponding plurality of frequency carriers associated with at least a portion of said different spatial streams.

12. The non-transitory machine-readable storage according to claim 7, wherein said plurality of multiplicative factors is computed based on said plurality of priority classes.

13. A system for handling multimedia information in a communication system, the system comprising:
   circuitry, in a wireless communication device, that enables control of one or both of a MAC layer and/or a PHY layer to wirelessly communicate different portions of multimedia information via different spatial streams based on content of said multimedia information, including:
   circuitry that enables definition of a plurality of priority classes based on said content associated with at least a portion of said multimedia information; and
   circuitry that enables generation of a transmitted signal by combining at least a portion of said different spatial streams wherein said combining is based on said plurality of priority classes.

14. The system according to claim 13, comprising circuitry that enables coding of at least a portion of said multimedia information.

15. The system according to claim 14, comprising circuitry that enables assignment of at least a portion of said coded said at least a portion of said multimedia information to one of said different spatial streams based on said one of said plurality of priority classes.

16. The system according to claim 15, comprising circuitry that enables mapping of said assigned said at least a portion of said coded said at least a portion of said multimedia information based on a modulation type.

17. The system according to claim 13, wherein said circuitry enables computation of a plurality of multiplicative factors for a corresponding plurality of frequency carriers associated with at least a portion of said different spatial streams.

18. The system according to claim 17, wherein said plurality of multiplicative factors is computed based on said plurality of priority classes.

* * * * *